United States Patent
Wu et al.

(10) Patent No.: US 9,103,989 B2
(45) Date of Patent: Aug. 11, 2015

(54) METHOD OF MANUFACTURING PHASE DIFFERENCE PLATE AND 3D DISPLAY PANEL

(75) Inventors: Yanbing Wu, Beijing (CN); Youmei Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 425 days.

(21) Appl. No.: 13/483,867

(22) Filed: May 30, 2012

(65) Prior Publication Data

US 2012/0307360 A1 Dec. 6, 2012

(30) Foreign Application Priority Data

May 31, 2011 (CN) .......................... 2011 1 0145645

(51) Int. Cl.
*G02B 27/26* (2006.01)
*G02B 27/22* (2006.01)
*G02B 5/30* (2006.01)

(52) U.S. Cl.
CPC .......... *G02B 5/3083* (2013.01); *G02B 27/2242* (2013.01); *G02B 27/26* (2013.01); *Y10T 29/49778* (2015.01)

(58) Field of Classification Search
None
See application file for complete search history.

(56) References Cited

U.S. PATENT DOCUMENTS

| | | | |
|---|---|---|---|
| 6,046,787 A | 4/2000 | Nishiguchi | |
| 6,128,059 A * | 10/2000 | Nishiguchi | 349/129 |
| 6,624,863 B1 | 9/2003 | Jacobs et al. | |
| 6,734,936 B1 | 5/2004 | Schadt et al. | |
| 6,735,017 B1 | 5/2004 | Acosta et al. | |
| 8,736,798 B2 * | 5/2014 | Kim et al. | 349/117 |
| 2001/0005284 A1 | 6/2001 | Lee et al. | |
| 2002/0008837 A1 | 1/2002 | Hisamitsu et al. | |
| 2002/0145682 A1 | 10/2002 | Kwon et al. | |
| 2002/0159004 A1 | 10/2002 | Jung | |
| 2008/0143638 A1 | 6/2008 | Kim et al. | |
| 2009/0021675 A1 | 1/2009 | Kishioka et al. | |
| 2011/0217638 A1 | 9/2011 | Kim et al. | |
| 2012/0307168 A1* | 12/2012 | Dong et al. | 349/15 |

FOREIGN PATENT DOCUMENTS

| | | |
|---|---|---|
| CN | 101349828 A | 1/2009 |
| CN | 101876767 A | 11/2010 |
| EP | 0 887 667 A2 | 12/1998 |
| JP | 10-253824 A | 9/1998 |
| JP | 11-084131 A | 3/1999 |

(Continued)

OTHER PUBLICATIONS

KIPO OA dated Aug. 26, 2013 Appln. No. 10-2012-0057531.

(Continued)

*Primary Examiner* — Jade R Chwasz
(74) *Attorney, Agent, or Firm* — Ladas & Parry LLP

(57) ABSTRACT

The disclosed technology relates to a method of manufacturing a phase difference plate and a three dimensional (3D) display panel. The method comprise the following steps: S1: applying an alignment layer on a surface of an upper polarizer of a display panel; S2: performing an alignment treatment on the alignment layer, so as to divide the alignment layer into a plurality of regions with at least two different alignment directions; and S3: applying a layer of reactive mesogens on the alignment layer subjected to the alignment treatment, and solidifying the reactive mesogens after being aligned, so as to form the phase difference plate.

10 Claims, 5 Drawing Sheets

(56) References Cited

FOREIGN PATENT DOCUMENTS

| JP | 11-084385 A | 3/1999 |
|----|----|----|
| JP | 2001-525080 A | 12/2001 |
| KR | 20050000572 A | 1/2005 |
| KR | 20070060812 A | 6/2007 |
| KR | 100783358 B1 | 12/2007 |
| KR | 100824782 B1 | 4/2008 |
| WO | 2005/012990 A1 | 2/2005 |

OTHER PUBLICATIONS

First Chinese Office Action dated Mar. 1, 2012 Appln. No. 201110145645.0.
Second Chinese Office Action dated Dec. 5, 2012 Appln. No. 201110145645.0.
First Chinese Office Action dated Mar. 1, 2012 Appln. No. 201110145466.7.
Second Chinese Office Action dated Dec. 5, 2012 Appln No. 201110145466.7.
Extended European Search Report dated Jan. 4, 2013; Appln. No. 12169927.6-2217/2530500.
Extended European Search Report dated Aug. 27, 2012; Appln. No. 12169915.1-2205.
Fourth Chinese Office Action dated Jan. 8, 2014; Appln. No. 201110145645.0
Korean Examination Opinion dated Mar. 28, 2014; Appln. No. 10-2012-0057531.
Korean Non-Final Rejection Appln. No. 10-2012-0057555; Dated Sep. 1, 2014.
Korean Final Rejection Appln. No. 10-2012-0057555; Dated Jul. 11, 2014.
Korean Re-Examination Appln. No. 10-2012-0057531; Dated Oct. 17, 2014.
EPO Communication dated Mar. 17, 2014; Appln No. 12 169 915.1-1904.
Second Chinese Office Action dated Nov. 20, 2013; Appln. No. 201110145466.7.
Korean Office Action; dated Feb. 14, 2014; Appln. No. 10-2012-0057555.
Korean Office Action dated Jul. 11, 2014; Appln. No. 10-2012-0057555.
Korean Office Action dated Aug. 8, 2014; Appln. No. 10-2012-0057531.
EPO Communication Appln. No. 12 169 915.1-1904; Dated Dec. 22, 2014.
USPTO NFOA Dated Dec. 16, 2014 in Connection With U.S. Appl. No. 13/483,912.

\* cited by examiner

METHOD OF MANUFACTURING PHASE DIFFERENCE PLATE AND 3D DISPLAY PANEL

CROSS REFERENCE TO RELATED APPLICATIONS

This application claims the benefit of Chinese Patent Application No. 201110145645.0 filed May 31, 2011, the entire disclosure of which is incorporated herein by reference.

Cross-reference is made to U.S. patent application Ser. No. 13/483,912 filed May 30, 2012, entitled "3D DISPLAY PANEL AND Method OF MANUFACTURING PHASE DIFFERENCE PLATE".

BACKGROUND

Embodiments of the disclosed technology relate to a method of manufacturing a phase difference plate and a three dimensional (3D) display panel.

Stereoscopic display has become a trend of the display field. And, the hypostasis of the stereoscopic display is to produce a stereoscopic effect by utilizing a parallax, i.e., a left-eye picture is seen by the left eye of a person, and a right-eye picture is seen by his/her right eye. The left-eye and right-eye pictures are a pair of stereoscopic images having the parallax.

One mode to achieve the stereoscopic display is of a serial type, i.e., at a first time, a left-eye picture is displayed on a display and the displayed picture is only seen by the left eye of a viewer at this time; and at a second time, a right-eye picture is displayed on the display and the displayed picture is only seen by the right eye of the viewer. The pictures will be retained on retinas of human eyes to give the person a feeling that the left-eye and right-eye pictures are simultaneously seen by the left and right eyes, thereby producing a stereoscopic sensation.

Another mode to achieve the stereoscopic display is of a parallel type, i.e., at the same time, content for a left-eye picture is displayed by a part of pixels on a display, and content for a right-eye picture is displayed by a part of pixels. The displayed right-eye picture only can be seen by the right eye and the displayed left-eye picture only can be seen by the left eye through devices such as gratings, polarized glasses, so as to produce the stereoscopic sensation.

Polarized glasses type stereoscopic display is a currently mainstream technology in the field of stereoscopic display, and the basic structure of this technology is to install a device for adjusting a polarization direction of light being emitted in front of a display panel. The device may be a phase difference plate, a liquid crystal cell, or other device capable of adjusting the polarization direction of the light emitted from different pixels. The principle of stereoscopic display of the phase difference plate is as shown in FIG. 1, and from top to bottom, there are: a picture displayed by the display panel, a phase difference plate, a picture formed by the light passing through the phase difference plate, and polarized glasses for viewing. On the display panel, a right-eye picture is shown in a row, and a left-eye picture is shown in a row. A phase difference plate is disposed in front of the display panel, one row has a $\lambda/2$ retardation ($\lambda$ is the wavelength of light), and one row has a zero retardation. The light emitted from pixels from the portion having the $\lambda/2$ retardation rotates, after passing through the phase difference plate, 90° in its polarization direction. Thus, only the light emitted by right-eye pixels can be seen by the right eye and only the light emitted by left-eye pixels can be seen by the left eye when polarized glasses, polarization directions of which for the left and right eyes are perpendicular to each other, are put on, so as to produce the stereoscopic effect. Alternatively, one row has a $\lambda/4$ retardation and one row has a $3\lambda/4$ retardation in a scheme.

In various polarized glasses stereoscopic displays, a technology in which a phase difference plate is employed is the most favorite. Its basic structure is that, the phase difference plate is attached to the display panel after being precisely aligned thereto. Different phase retardations can be produced in different regions on the phase difference plate, so that light from different pixels is emitted in different polarization directions and a viewer can see a 3D effect when wearing polarized glasses.

Currently, a method of manufacturing a 3D display panel based on a phase difference plate is: firstly, the phase difference plate is produced on a substrate (e.g., a glass or a thin film substance) for the phase difference plate, and then the phase difference plate is attached to the display panel with a double-side tape or other adhesives. Its base structure is as shown in FIG. 2. A phase difference plate 2, which is produced on a substrate 1 for the phase difference plate, is adhered to an upper polarizer 4 of a display panel 5 with an adhesive 3.

Problems present in the above manufacture process of the phase difference plate lie in that, when the phase difference plate is aligned and attached to the display panel, it is always difficult to align precisely, so that the accuracy is very low, leading to a very low yield and severe crosstalk for a 3D product which is manufactured in this manner; moreover, as a layer of the adhesive 3 and the substrate 1 for the phase difference plate are added, loss of light will occur; and a distance from a light emitting point (red, green and blue light emitting points on a display substrate) to the phase difference plate is increased, thereby reducing the viewing angle. These problems have severely hindered the development of the phase difference plate type 3D display.

SUMMARY

An embodiment of the disclosed technology provides a method of manufacturing a phase difference plate, comprising the following steps: S1: applying an alignment layer on a surface of an upper polarizer of a display panel; S2: performing an alignment treatment on the alignment layer, so as to divide the alignment layer into a plurality of regions with at least two different alignment directions; and S3: applying a layer of reactive mesogens on the alignment layer subjected to the alignment treatment, and solidifying the reactive mesogens after being aligned, so as to form the phase difference plate.

Another embodiment of the disclosed technology provides a three dimensional (3D) display panel, comprising: a display panel; an upper polarizer and a lower polarizer attached to an upper surface and a lower surface of the display panel; and a phase difference plate directly covering on the upper polarizer.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Figure 1:
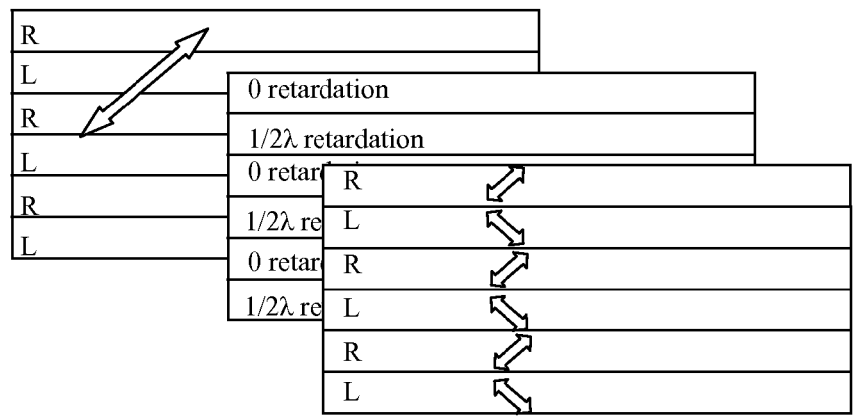
FIG. 1 is a schematic view showing the principle of achieving a 3D display by employing a phase difference plate in prior art.
Figure 1:
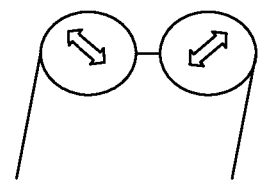
Figure 2:
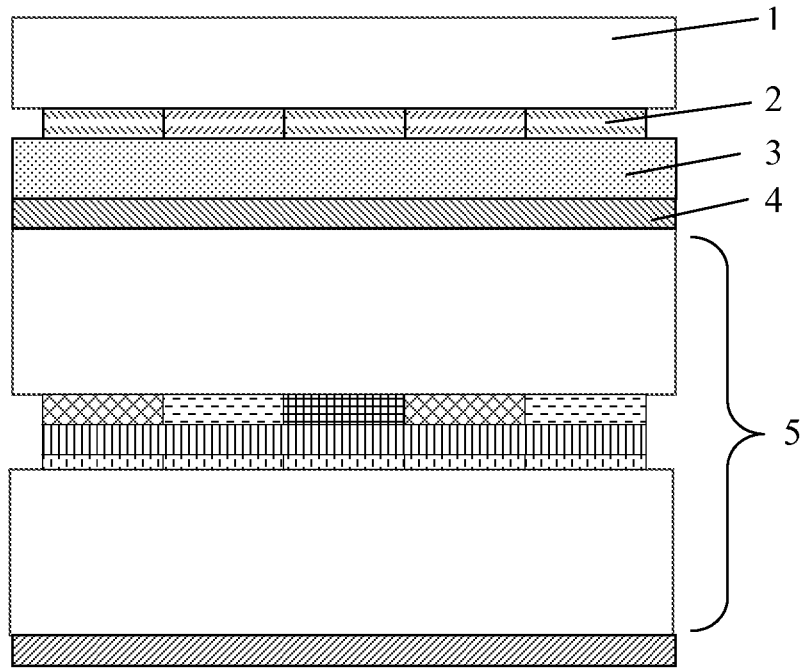
FIG. 2 is a schematic view showing a structure in which a phase difference plate is attached to a polarizer in an attachment manner in prior art.

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

Embodiment 1

A method of manufacturing a phase difference plate according to an embodiment of the disclosed technology comprises the following steps:

Step S301, applying an alignment layer for the phase difference plate on a surface of an upper polarizer of a display panel. Preferably, material for the alignment layer may not react with the material for the upper surface of the polarizer, and has a stronger adhesion to it. The polarizer concerned in each embodiment of the disclosed technology (including the upper polarizer and a lower polarizer), refers to an optical device capable of achieving a function of light polarization, including but not limited to the conventional polarizer.

Step S302, performing an alignment treatment on the alignment layer to divide the alignment layer into a plurality of regions having at least two different alignment directions. A specific manner of the alignment treatment is as follows: a mask is disposed on the alignment layer, and the alignment treatment is performed with irradiation of UV light, so as to divide the exposed alignment layer into the plurality of regions having different alignment directions. Of course, except for the above method of utilizing the UV light irradiation, the specific manners of the alignment treatment can also be other methods used in the field. In the embodiment, for example, it is possible to divide the alignment layer into the plurality of regions having two different alignment directions. A specific manner of the alignment treatment may be as follows: a mask is disposed on the alignment layer, and the alignment treatment is performed with irradiation of UV light, so as to divide the exposed alignment layer into the plurality of regions having two different alignment directions. For example, an angle between the two different alignment directions may be 45° to 135°. Preferably, the angle between the alignment directions is 90°. Further, one of the alignment directions is parallel to a polarization direction of light emitted from the upper polarizer, and another alignment direction is perpendicular to the polarization direction of the light emitted from the upper polarizer. The above preferable angle between the polarization directions is set as 90°, which is a preferable design on the premise that the angle between the polarization directions for two lenses of existing polarized glasses and so on is 90°. It can be understood by those skilled in the art that, in the embodiment, a 3D display effect can be realized only if polarization directions for the upper polarizer of the display panel, the phase different plate and the polarized glasses match with one another. In the case where the angle between polarization directions for different lenses of the polarized glasses is not 90° (for example, may also be 60°), the angle between different alignment directions for individual regions of the alignment layer is preferably not 90° (for example, may also be 60°), either.

Figure 3:
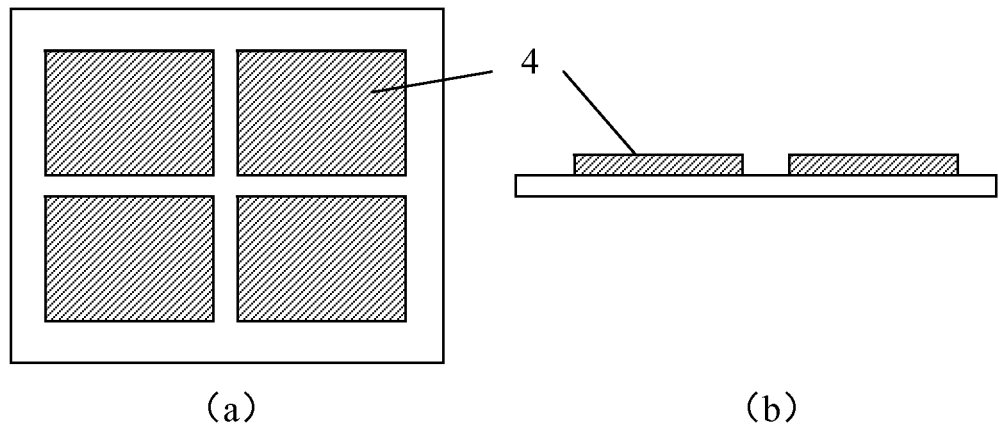
FIG. 3 is a view showing a model obtained after a cell forming process for a display panel is completed and a polarizer is attached, (a) is a top view, and (b) is a sectional view.
Figure 4:
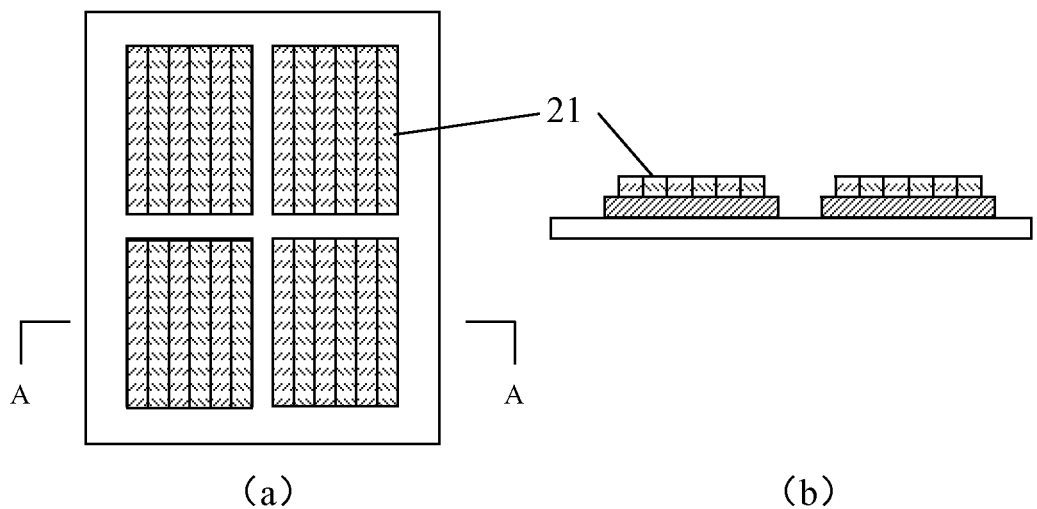
FIG. 4 is a schematic view obtained after an alignment layer for a phase difference plate is produced on the model shown in FIG. 3, in which, the alignment layer is divided into a number of vertical bar-like regions, (a) is a top view, and (b) is sectional view taken along the line A-A.

The two kinds of regions, which have different alignment directions, of the alignment layer may be two regions with different alignments in any form. For example, a number of bar-like regions with certain alignment angles are formed on the upper polarizer, and every two adjacent bar-like regions have different alignment directions. The bar-like regions may extend in a horizontal direction, a vertical direction or any other directions. However, for the purpose of productive convenience, in the embodiment, the alignment layer is divided into a number of vertical bar-like regions, and every two adjacent bar-like regions have different alignment directions. For example, the two kinds of regions with two different alignment directions can be arranged alternately. As shown in FIGS. 3 and 4, (a) and (b) in FIG. 3 show states after a cell forming process for a display panel and attachment of the polarizer are completed. As a plurality of panels are produced on a large glass plate (mother plate) in a general panel production, a case in which four panels are produced is shown in the figures. Of course, the process method may also be executed for a single piece of panel. The display panels in the embodiment may also be organic electroluminescent panels (EL), plasma display panels (PDP), or other display panels, except LCDs. (a) and (b) in FIG. 4 show an alignment layer 21 applied on an upper polarizer 4 and subjected to alignment. The alignment layer 21 is divided into a number of vertical bar-like regions, and every two adjacent bar-like regions have different alignment directions, i.e., regions having different alignment directions are arranged alternately. To ensure the display effect, each column of sub-pixels only can be covered by one kind of bar-regions (i.e., regions having one alignment direction), and each bar-like region may cover a part or all of one column of the sub-pixels, or may also cover more than one column of the sub-pixels. Preferably, to obtain a better display effect, each bar-like region covers at least one column of the sub-pixels.

Figure 5:
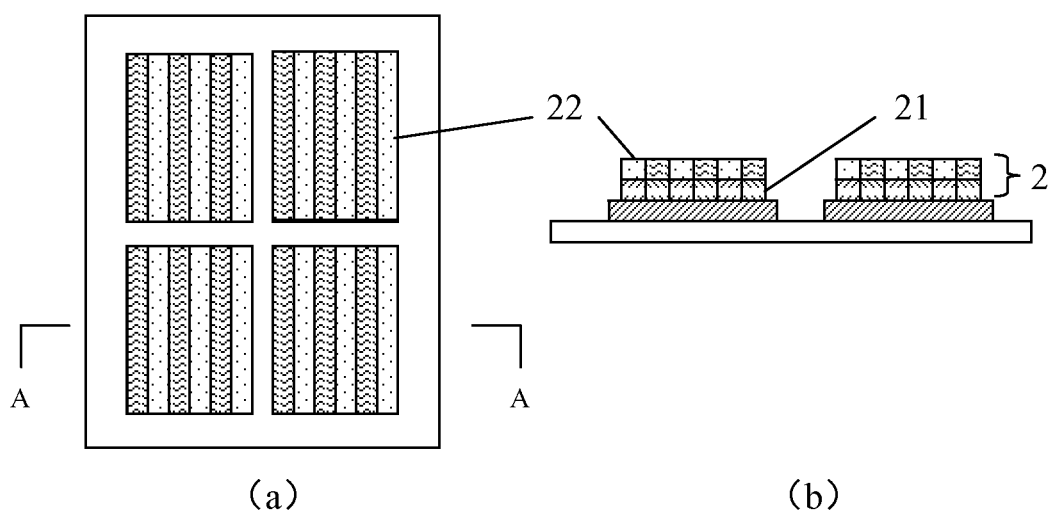
FIG. 5 is a schematic view obtained after a reactive mesogens (RM) is applied onto the alignment layer of the model shown in FIG. 4, (a) is a top view, and (b) is sectional view taken along the line A-A.
Figure 6:
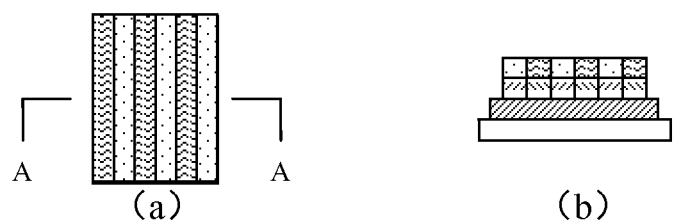
FIG. 6 is a schematic view obtained after a plurality of display panels shown in FIG. 5 are cut apart to obtain a single display panel, (a) is a top view, and (b) is sectional view taken along the line A-A.

Step S303, applying a reactive mesogens (briefly referred as RM) on the alignment layer subjected to the alignment treatment, and solidifying the RM after being aligned, so as to form the phase different plate. In the embodiment, for example, RM is a liquid crystal polymer. As shown in (a) and (b) of FIG. 5, RM 22 covers over the alignment layer 21. As the RM 22 is affected by the alignment direction of the alignment layer 21 before it is solidified, the alignment direction of the RM 22 after being solidified is consistent with the alignment direction of the alignment layer 21 directly thereunder. That is, the RM after being solidified is also in a form that regions having different alignment directions are arranged alternately, to thereby form the phase different plate 2. FIG. 6 shows a case where a single panel is cut off. Due to lack of protection by a substrate for the phase difference plate, in order to avoid the phase difference plate from being scratched during cutting or carrying, a step of attaching a protective film on a surface of the phase difference plate can further be included after step S303.

Embodiment 2

Figure 7:
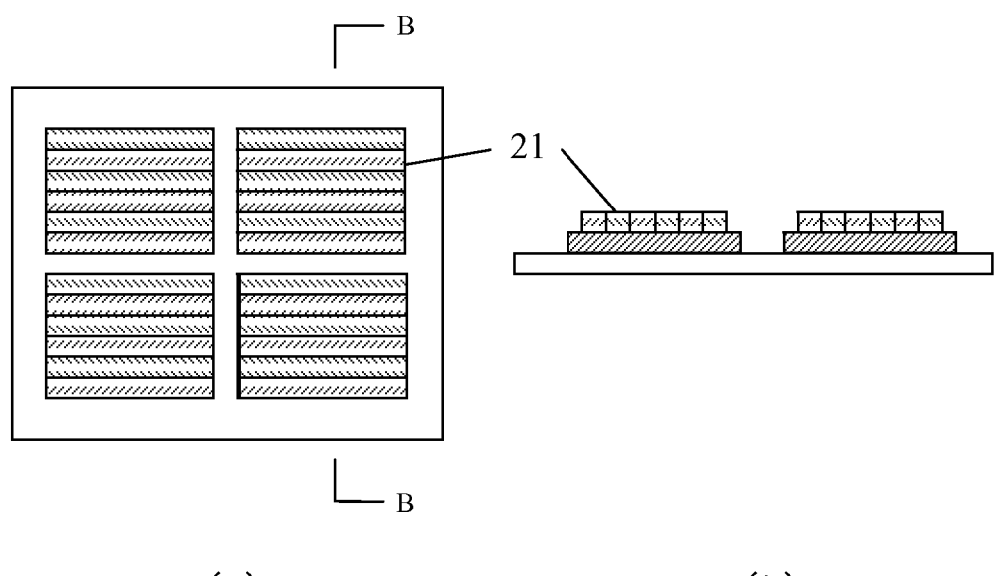
FIG. 7 is schematic view obtained after an alignment layer for a phase difference plate is produced on the model shown in FIG. 3, in which, the alignment layer is divided into a number of horizontal bar-like regions, (a) is a top view, and (b) is sectional view taken along the line B-B.
Figure 8:
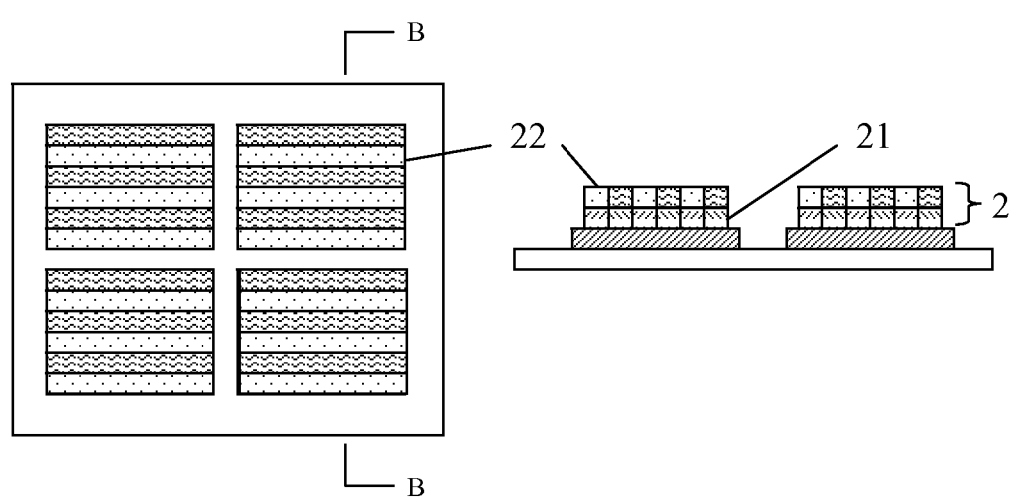
FIG. 8 is a schematic view obtained after a reactive mesogens (RM) is applied onto the alignment layer of the model shown in FIG. 7, (a) is a top view, and (b) is sectional view taken along the line B-B.
Figure 9:
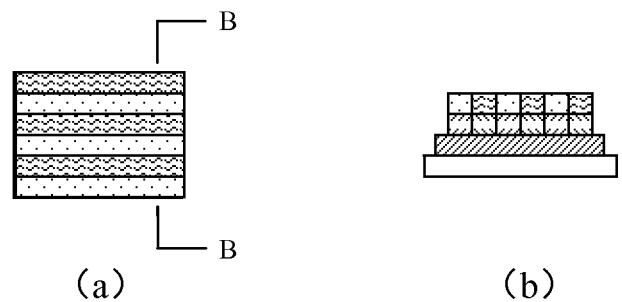
FIG. 9 is a schematic view obtained after a plurality of display panels shown in FIG. 8 are cut apart to obtain a single display panel, (a) is a top view, and (b) is sectional view taken along the line B-B.

As shown in FIGS. 7, 8 and 9, the difference between the present embodiment and the first embodiment lies in that, in step S302, an alignment layer is divided into a number of horizontal bar-like regions (i.e., bar-like regions extending in a horizontal direction) after an alignment treatment is performed on the alignment layer, and every two adjacent bar-like regions have different alignment directions. That is, bar-like regions with different alignment directions are arranged alternately in a vertical direction. To ensure the display effect, each row of sub-pixels can only be covered by one kind of the bar-like regions (i.e., regions with one alignment direction), and each bar-like region may cover a part or all of one row of the sub-pixels, or may also cover more than one row of the sub-pixels. Preferably, to obtain a better display effect, each bar-like region covers at least one row of the sub-pixels.

Figure 10:
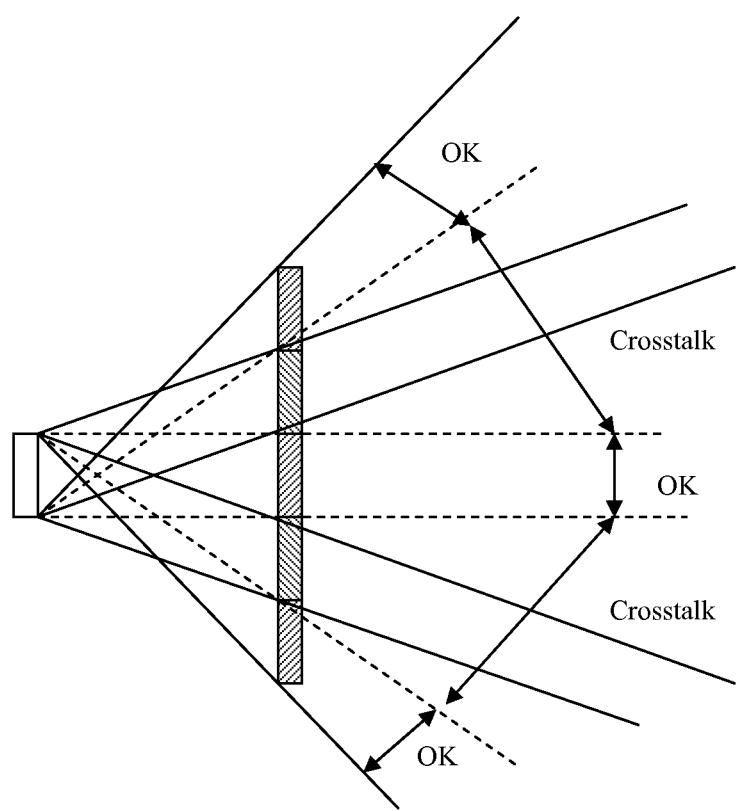
FIG. 10 is view showing an effect when viewing of a 3D picture is achieved by means of utilizing a phase difference plate.

The case where horizontal bar-like regions are used on the phase difference plate is superior to the case where vertical bar-like regions are used in terms of the viewing effect. As shown in FIG. 10, one pixel is shown merely as an example to illustrate the viewing effect of user. As shown, a number of bar-like regions are in front of the one pixel. Letting the pixel provide content for a left-eye picture, light emitted from the pixel via a left oblique line can be selected by a polarized lens for the left eye, and light emitted from the pixel via a right oblique line will cause a crosstalk. As can be seen in the figure, if regions with different alignments are of horizontal bar-like shape, an OK region and a crosstalk region occur alternately in a vertical direction; and if regions with different alignments are vertical bar-like shape, the OK region and the crosstalk region occur alternately in a horizontal direction. Human eyes are located horizontally and they have fewer opportunities to move up and down and have more opportunities to move left and right. Therefore, if the vertical bar-like regions are used on the phase difference plate, the OK region and the crosstalk region will occur alternately in the horizontal direction, causing a phenomenon that the right eye is located in the crosstalk region when the left eye is in the OK region, or enters into the crosstalk region if the eyes move slightly, so as to affect the viewing. If the horizontal bar-like regions are used on the phase difference plate, the OK region and the crosstalk region will occur alternately in the vertical direction. As such, both eyes will always fall into the OK region provided that a person sits in a place.

In the practice, there is always a case of screen overturning, and the picture will be overturned along with it, especially for some handheld terminal products. After overturned, the bar-like regions of the phase different plate may become vertical from horizontal, or become horizontal from vertical. Therefore, the 3D display effects achieved by embodiments 1 and 2 may interchange.

Embodiment 3

Figure 11:
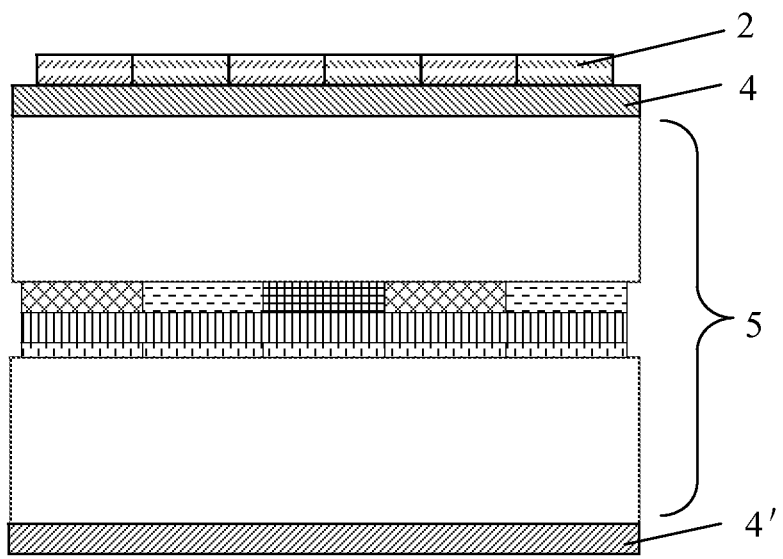
FIG. 11 is a sectional view obtained after a phase difference plate is produced on a surface of an upper polarizer of a display panel.

In the embodiment, a 3D display panel is provided. As shown in FIG. 11, the 3D display panel comprises a display panel 5, an upper polarizer 4 and a lower polarizer 4' attached on upper and lower surfaces of the display panel 5, and a phase difference plate 2 directly covering over the upper polarizer 4. In the embodiment, the phase difference plate directly covering the upper polarizer means that the phase difference plate is formed over the upper polarizer. The phase difference plate may be formed integrally with the polarizer, or alternatively, may be a phase difference plate formed on an existing polarizer through a subsequent process. Further, a surface of the phase difference plate 2 may further be attached with a layer of protective film. The display panel 5 may also be an organic electroluminescent panel (EL), a plasma display panel (PDP) or other display panel, except a liquid crystal display panel (LCD).

The phase difference plate 2 in the embodiment comprises an alignment layer directly contacting with the upper polarizer 4. The alignment layer is divided into a plurality of regions with at least two different alignment directions. A layer of reactive mesogens (RM) may cover a surface of the alignment layer. The reactive mesogens (RM) has a birefringence characteristic and is capable of being aligned and solidified. Preferably, the RM is a liquid crystal polymer. The solidified RM has the same alignment direction as a region of the alignment layer directly thereunder. Thus, in correspondence with different regions of the alignment layer, the solidified RM is also formed into a plurality of regions with different alignment directions. Specifically, the alignment layer may be divided into a number of bar-like regions, and every two adjacent bar-like regions have different alignment directions. The bar-like regions may extend in a horizontal direction, a vertical direction or any other direction, and preferably extend in the horizontal direction.

To ensure the display effect, each column (row) of sub-pixels can only be covered by bar-like regions with the same alignment direction, and each bar-like region may cover a part or all of one column (row) of the sub-pixels, or may also cover more than one column (row) of the sub-pixels. Preferably, to obtain a better display effect, each bar-like region covers at least one column (row) of the sub-pixels.

The plurality of regions with different alignment directions are preferably regions with two different alignment directions. In the case where the regions of the alignment layer have two different alignment directions, an angle between the two different alignment directions may be 45° to 135°. Preferably, the angle between the alignment directions is 90°. Further, one of the alignment directions is parallel to a polarization direction of light emitted from the upper polarizer, and another alignment direction is perpendicular to the polarization direction of the light emitted from the upper polarizer. The above preferable angle between alignment directions is set as 90°, which is a preferable design on the premise that an angle between polarization directions for two lenses of existing polarized glasses is 90°. It can be understood by those skilled in the art that, in the embodiment, a 3D display effect can be realized only if polarization directions for the upper polarizer of the display panel, the phase different plate and the polarized glasses match with one another. In the case where the angle between polarization directions for two lenses of the polarized glasses is not 90° (for example, may also be 60°), the angle between different alignment directions for individual regions of the alignment layer is preferably not 90° (for example, may also be 60°), either.

The phase difference plate covering on the upper polarizer of the 3D display panel in the embodiment may be a phase difference plate produced according to the above method in the embodiment 1 or embodiment 2.

According to embodiments of the disclosed technology, the phase difference plate is directly produced on the upper polarizer without a process of attaching the phase difference plate to the display panel, and an exposure method is used for alignment of the alignment layer and has a higher accuracy than a mechanic aligning manner used in the attachment process, thereby enhancing the alignment accuracy of the phase difference plate with the display panel and the yield of the product. Further, use of a substrate for the phase difference plate and an adhesive is reduced, so as to decrease the cost, and meanwhile reduce the loss of transmissive light and extend the viewing angle.

A 3D display device comprising the above 3D display panel is also provided by the embodiment. The 3D display device may be a television, notebook computer, cell phone, PSP or other electronic device. Certainly, from a broader viewpoint, the above 3D display panel itself is a kind of the 3D display device.

The 3D display device (comprising the above 3D display panel) in the embodiment has advantages of low production cost and good display effect.

Some embodiments of the disclosed technology set forth above are merely illustrative. For example, the above phase difference plate comprises the alignment layer and RM over the alignment layer. Practically, function of the phase difference plate can be realized by the alignment layer itself. Thus, the phase difference plate according to embodiments of the disclosed technology may also only include the alignment layer, but not include the RM layer.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. A method of manufacturing a phase difference plate, comprising the following steps:

S1: applying an alignment layer on a surface of an upper polarizer of a completed display panel, the upper polarizer being formed on an outer surface of the display panel;

S2: performing an alignment treatment on the alignment layer, so as to divide the alignment layer into a plurality of regions with at least two different alignment directions; and S3: applying a layer of reactive mesogens on the alignment layer subjected to the alignment treatment, and solidifying the reactive mesogens after being aligned, so as to form the phase difference plate, the completed display panel comprising an upper substrate and a lower substrate cell-assembled together.

2. The method of manufacturing a phase difference plate of claim 1, wherein the step S2 is: performing the alignment treatment on the alignment layer, so as to divide the alignment layer into the plurality of regions with two different alignment directions.

3. The method of manufacturing a phase difference plate of claim 2, wherein an angle between the two different alignment directions is 45° to 135°.

4. The method of manufacturing a phase difference plate of claim 3, wherein an angle between the two different alignment directions is 90°.

5. The method of manufacturing a phase difference plate of claim 4, wherein, among the two different alignment directions, one alignment direction is parallel to a polarization direction of light emitted from the upper polarizer, and another alignment direction is perpendicular to the polarization direction of the light emitted from the upper polarizer.

6. The method of manufacturing a phase difference plate of claim 2, wherein, in the step S2, after the alignment treatment is performed on the alignment layer, the alignment layer is divided into a plurality of vertical or horizontal bar-like regions, and every two adjacent bar-like regions have different alignment directions.

7. The method of manufacturing a phase difference plate of claim 1, wherein, in the step S2, after the alignment treatment is performed on the alignment layer, the alignment layer is divided into a plurality of vertical or horizontal bar-like regions, and every two adjacent bar-like regions have different alignment directions.

8. The method of manufacturing a phase difference plate of claim 1, wherein, in the step S2, a mask is disposed on the alignment layer, and the alignment treatment is performed with irradiation of UV light.

9. The method of manufacturing a phase difference plate of claim 1, wherein the reactive mesogens is a substance having a birefringence characteristic and capable of being aligned and solidified.

10. The method of manufacturing a phase difference plate of claim 9, wherein the reactive mesogens is a liquid crystal polymer.

* * * * *